US011381579B2

(12) United States Patent
Chaula et al.

(10) Patent No.: US 11,381,579 B2
(45) Date of Patent: Jul. 5, 2022

(54) IDENTIFYING FRAUDULENT REQUESTS FOR CONTENT

(71) Applicant: Oath Inc., New York, NY (US)

(72) Inventors: Gaurav Chaula, New Delhi (IN); Kavind Aggarwal, Delhi (IN)

(73) Assignee: YAHOO AD TECH LLC, Dulles, VA (US)

( * ) Notice: Subject to any disclaimer, the term of this patent is extended or adjusted under 35 U.S.C. 154(b) by 305 days.

(21) Appl. No.: 16/354,289

(22) Filed: Mar. 15, 2019

(65) Prior Publication Data

US 2020/0296118 A1    Sep. 17, 2020

(51) Int. Cl.
H04L 9/40    (2022.01)

(52) U.S. Cl.
CPC .............................. H04L 63/1416 (2013.01)

(58) Field of Classification Search
CPC .................... H04L 63/1416; H04L 63/1425
USPC ........................................................ 726/23
See application file for complete search history.

(56) References Cited

U.S. PATENT DOCUMENTS

| | | | | |
|---|---|---|---|---|
| 7,657,594 B2 * | 2/2010 | Banga | ................. | G06F 16/9535 709/224 |
| 7,908,645 B2 * | 3/2011 | Varghese | .............. | G06F 21/552 715/833 |
| 8,554,912 B1 * | 10/2013 | Reeves | ................. | G06F 21/552 455/410 |
| 8,799,076 B2 * | 8/2014 | Doughty | ............ | G06Q 30/0261 705/14.66 |
| 9,203,860 B1 * | 12/2015 | Casillas | .................. | G06F 21/46 |
| 9,578,499 B2 * | 2/2017 | Brill | ...................... | G06F 21/316 |
| 10,171,495 B1 * | 1/2019 | Bowen | .................. | G06N 7/005 |
| 10,320,841 B1 * | 6/2019 | Allen | ...................... | G06N 20/00 |
| 10,796,079 B1 * | 10/2020 | Bradley | .............. | H04L 43/0852 |
| 2012/0167162 A1 * | 6/2012 | Raleigh | ............... | H04W 12/128 726/1 |
| 2012/0233665 A1 * | 9/2012 | Ranganathan | .......... | G06F 21/51 726/4 |
| 2014/0373148 A1 * | 12/2014 | Nelms | ................. | H04L 63/1441 726/23 |
| 2015/0235275 A1 * | 8/2015 | Shah | .................. | G06Q 30/0269 705/14.66 |
| 2016/0048831 A1 * | 2/2016 | Ongchin | ............ | G06Q 20/3276 705/44 |
| 2016/0171499 A1 * | 6/2016 | Meredith | ........... | G06Q 20/4016 705/44 |

(Continued)

*Primary Examiner* — Badrinarayanan
*Assistant Examiner* — Badri Champakesan
(74) *Attorney, Agent, or Firm* — Cooper Legal Group LLC

(57) ABSTRACT

One or more computing devices, systems, and/or methods for determining whether requests for content are fraudulent are provided. A request for content may be received from a first device. A first user profile associated with the first device may be identified. The first user profile may comprise activity information associated with the first device, demographic information associated with the first device and/or interest information associated with the first device. A user profile database may be analyzed to identify a set of user profiles similar to the first user profile. A relevance score associated with the request for content may be generated based upon the resource, the set of user profiles and/or the first user profile. The relevance score may be compared with a threshold relevance to determine whether the request for content is fraudulent.

20 Claims, 13 Drawing Sheets

(56) References Cited

U.S. PATENT DOCUMENTS

| | | | | |
|---|---|---|---|---|
| 2017/0085587 A1* | 3/2017 | Turgeman | ............ | G06F 3/03547 |
| 2018/0375887 A1* | 12/2018 | Dezent | .................... | H04L 67/30 |
| 2019/0140847 A1* | 5/2019 | Piel | ......................... | G06F 21/40 |
| 2020/0034853 A1* | 1/2020 | Lim | ................... | G06Q 30/0609 |
| 2020/0042723 A1* | 2/2020 | Krishnamoorthy | ..... | G06F 21/45 |
| 2020/0167785 A1* | 5/2020 | Kursun | ................. | H04L 43/045 |

* cited by examiner

IDENTIFYING FRAUDULENT REQUESTS FOR CONTENT

BACKGROUND

Many applications, such as websites, applications, etc. may provide platforms for viewing media. For example, a request for media may be received from a device associated with a user. Responsive to receiving the request for media, media may be transmitted to the device. However, the request for media may be fraudulent.

SUMMARY

In accordance with the present disclosure, one or more computing devices and/or methods are provided. In an example, user activity performed using a first device associated with a first user account may be detected. A first user profile associated with the first user account may be generated. The first user profile may comprise activity information associated with the user activity, demographic information associated with the first user account and/or interest information associated with the first user account. A request for content may be received from a second device associated with the first user account. A resource associated with the request for content may be determined based upon the request for content. A user profile database may be analyzed based upon the first user profile to identify a set of user profiles similar to the first user profile. A relevance score associated with the request for content may be generated based upon the resource, the set of user profiles and/or the first user profile. The relevance score may be compared with a threshold relevance to determine whether the request for content is fraudulent.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
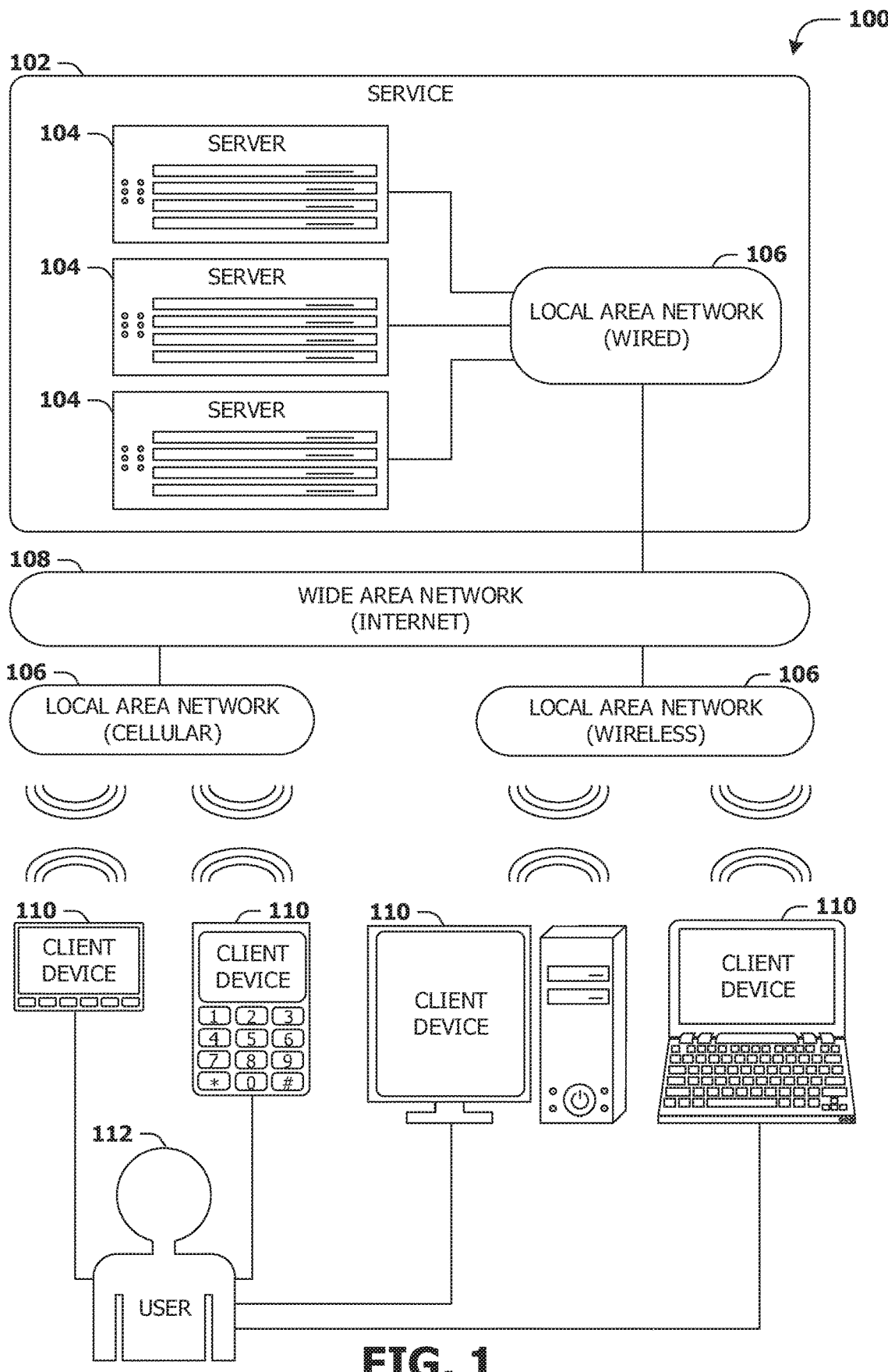
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
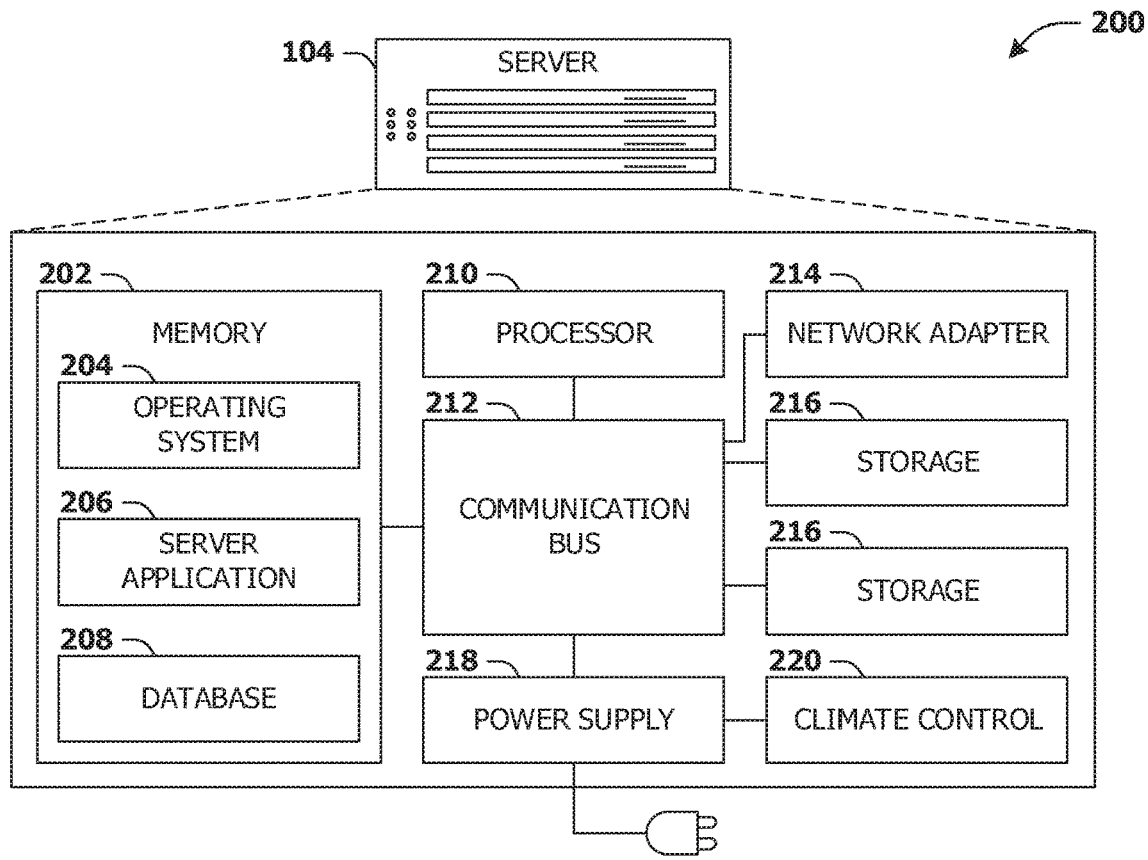
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
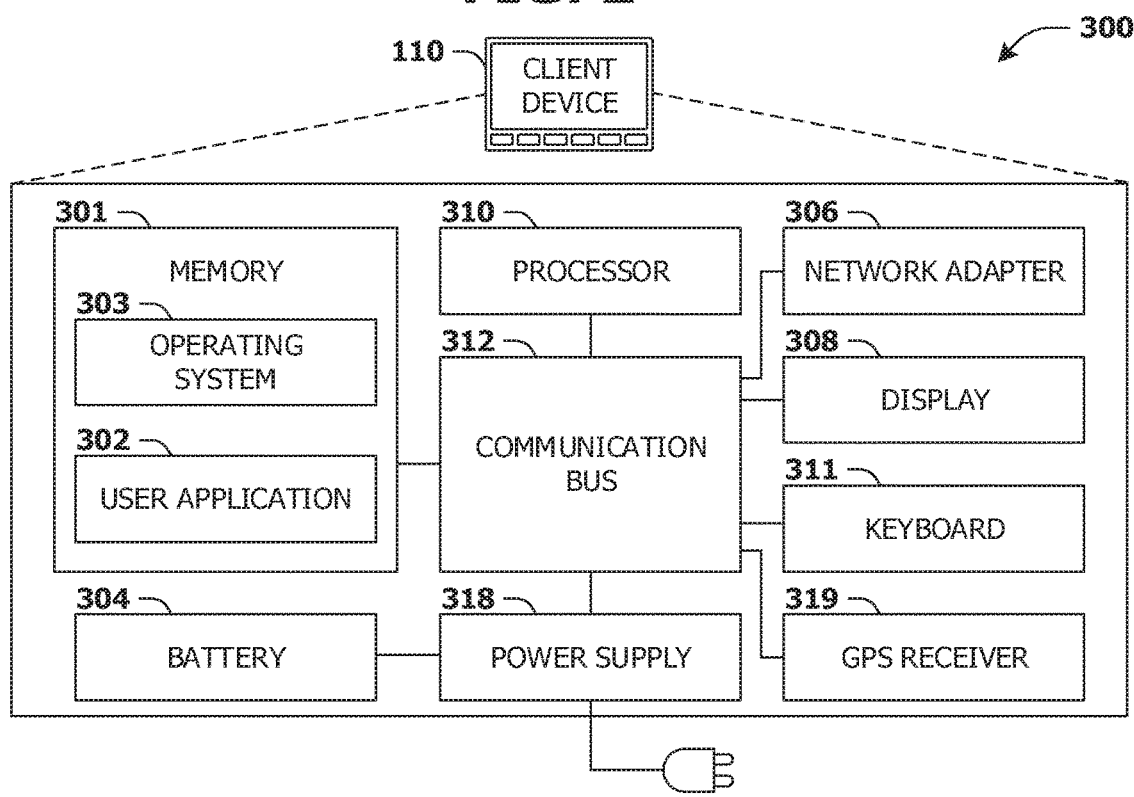
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining whether requests for content are fraudulent are provided. For example, a user (and/or a device associated with the user) may access and/or interact with a service, such as a browser, software, a website, an application, an operating system, etc. that provides a platform for viewing and/or downloading content from a server associated with a content system. In some examples, a request for content may be received from the device. However, the request for content may be fraudulent. For example, the device may be controlled, via one or more of malware, hacking techniques, etc. associated with a malicious entity, to transmit the request for content (to the content system) (without the user's knowing and/or consent).

Thus, in accordance with one or more of the techniques presented herein, user activity performed using the device may be analyzed generate a user profile comprising activity information associated with the user activity, demographic information associated with the device and/or interest information associated with the device. A request for content may be received from the device. A resource (e.g., a web page and/or an application that hosts content associated with the request for content) may be determined based upon the request for content. A user profile database may be analyzed based upon the first user profile to identify a set of user profiles similar to the first user profile. A relevance score associated with the request for content may be generated based upon the resource, the set of user profiles and/or the first user profile. The relevance score may be compared with a threshold relevance to determine whether the request for content is fraudulent. Responsive to a determination that the request for content is not fraudulent, a content item, associated with the request for content, may be transmitted to the device (to be presented via the resource). Responsive to a determination that the request for content is fraudulent, a content item associated with the request for content may not be transmitted to the device.

Figure 4:
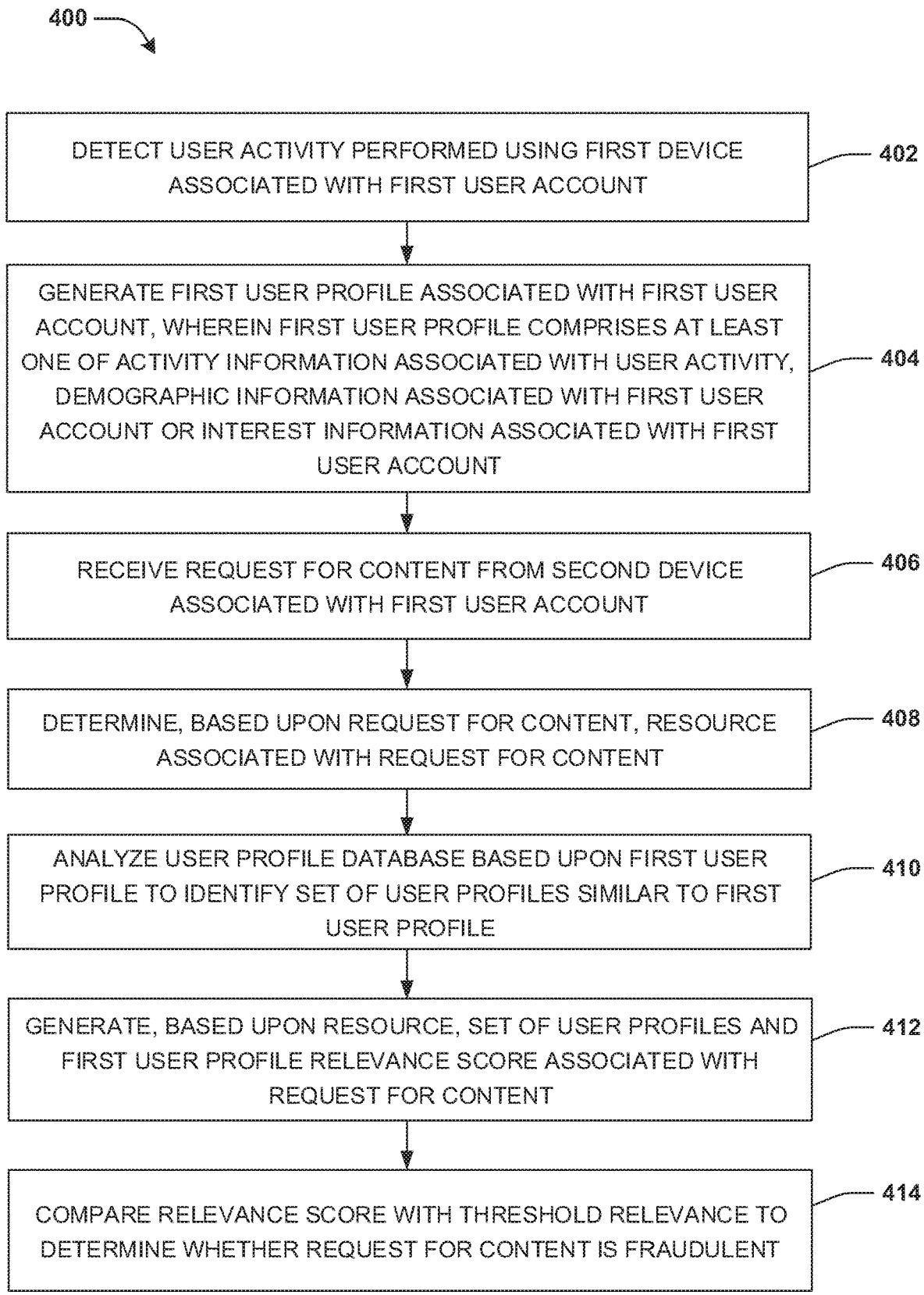
FIG. 4 is a flow chart illustrating an example method for determining whether requests for content are fraudulent.

An embodiment of determining whether requests for content are fraudulent is illustrated by an example method 400 of FIG. 4. A first user, such as user Jill, (and/or a first client device associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system.

In some examples, the content system may be an advertisement system (and/or the content system may not be an advertisement system). Alternatively and/or additionally, the content system may provide content items to be presented via pages associated with the content system. For example, the pages may be associated with websites (e.g., search engine websites, email service websites, news content websites, communication service websites, video platform websites, multimedia platform websites, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application (e.g., a mobile application) associated with the content system and/or within a game associated with the content system. Alternatively and/or additionally, a user may be required to watch and/or interact with the content item before the user can access content of a web page, utilize resources of an application and/or play a game.

At 402, first user activity performed using the first client device associated with a first user account may be detected. In some examples, the first user activity may be performed using a first content interface. For example, a first graphical user interface of the first client device may be controlled to display the first content interface. The first content interface may comprise one or more of a communication interface (e.g., an email interface, a messaging interface, etc.), a news content interface (for consuming news articles), a multimedia platform (for uploading, downloading, consuming and/or sharing one or more of videos, audio, etc.), a social media platform (for uploading, downloading, consuming and/or sharing one or more of social media posts, content, etc.), etc.

In some examples, the first content interface may comprise a plurality of content items of a content items database associated with the first content interface and/or the first user account (associated with the first user and/or the first client device). In some examples, the content items database may comprise a second plurality of content items. For example, the second plurality of content items may comprise email items, message items, news items, video items, audio items, etc. Alternatively and/or additionally, the first content interface may comprise a plurality of selectable inputs associated with transmitting items, deleting items, managing the first user account, accessing and/or consuming items, etc. Alternatively and/or additionally, the first content interface may comprise one or more text areas associated with composing messages and/or emails, editing and/or creating reports and/or social media posts, etc.

In some examples, the first user activity may comprise selectable inputs of the first content interface being selected (e.g., clicked, pressed, etc.) using a touchscreen (of the first client device), one or more switches (e.g., one or more buttons), a conversational interface (e.g., a voice recognition and natural language interface), etc. For example, the selectable inputs may correspond to one or more content items of the plurality of content items, one or more settings associated with the first user account, etc. Alternatively and/or additionally, the first user activity may comprise text being inputted into one or more text areas of the first content interface. Alternatively and/or additionally, the first user activity may comprise one or more content items being consumed.

In some examples, the first user activity may include activity performed using one or more content interfaces different than the first content interface. For example, the one or more content interfaces and/or the first content interface may be associated with a (single) system. Each content interface of the one or more content interfaces may be associated with a service, of a plurality of services, provided by the system. For example, the system may be an internet system providing a plurality of content interfaces, where each content interface of the plurality of content interfaces may provide a service of the plurality of services (e.g., a search engine service, a news content service, a multimedia platform service, an email interface, a messaging interface, a social media interface, an internet shopping interface, etc.).

Alternatively and/or additionally, the first user activity may include activity performed using one or more client devices, different than the first client device, of a plurality of client devices associated with the first user account. For example, each client device of the one or more client devices may have the first content interface installed (e.g., a version of the first content interface associated with a client device of the one or more client devices may be installed on the client device). Alternatively and/or additionally, each client device of the one or more client devices may have a content interface (e.g., a content interface of the one or more content interfaces) associated with the system installed. Alternatively and/or additionally, the first content interface may comprise a web interface accessed via a browser of the first client device and/or browsers of the one or more client devices.

In some examples, the first user activity may be monitored and/or analyzed. The first user activity may comprise one or more of one or more content items being opened, one or more content items being shared, one or more content items being consumed, one or more content items being accessed, etc. In some examples, it may be determined that a content item of the plurality of content items is consumed based upon interactions with the content item (e.g., selecting sets of text of the content item, scrolling through portions of the content item, pressing pause and/or play, etc.), a duration of time that the content item is displayed, etc. For example, the one or more content items may comprise one or emails, one or more messages, one or more articles, one or more videos, one or more audio files, one or more images, one or more web pages, etc. Alternatively and/or additionally, the first user activity may comprise one or more emails and/or messages being replied to, one or more emails and/or messages being composed, etc.

Alternatively and/or additionally, the first user activity may comprise one or more searches being performed. For example, the first content interface (and/or a content interface of the one or more content interfaces) may be associated with a search interface. For example, the search interface may be configured for generating search results based upon queries. For example, the search interface may be an internal website search interface designed to search for information comprised within a single website. Alternatively and/or additionally, the search interface may be a web search engine designed to search for information throughout the internet. For example, one or more queries may be inputted into a search field of the search interface (using the touchscreen, the one or more switches, the conversational interface, etc.) in order to perform the one or more searches. For example, each query of the one or more queries may comprise a set of characters (e.g., "cars", "J brand cars", "j2 cars", "night dress", etc.).

At 404, a first user profile associated with the first user account (and/or the first client device) may be generated. For example, the first user profile may comprise first activity information associated with the first user activity, first demographic information associated with the first user account (and/or the first client device) and/or first interest information associated with the first user account (and/or the first client device). In some examples, the first user profile may be stored in a user profile database comprising a plurality of user profiles associated with user accounts (and/or client devices).

In some examples, the first activity information may comprise one or more of indications of the selectable inputs (selected via the first content interface and/or the one or more content interfaces during the first user activity), indications of one or more consumed content items (e.g., one or more of one or more consumed emails, one or more consumed messages, one or more articles, one or more consumed videos, one or more consumed audio files, one or more consumed images, one or more consumed presentations, one or more consumed web pages consumed during the first user activity, etc.), indications of one or more composed emails associated with the first user activity, indications of one or more composed messages associated with the first user activity, indications of one or more queries inputted into the search interface for performing searches during the first user activity, indications of one or more web pages accessed by the first client device, etc.

In some examples, the first demographic information may comprise an age (and/or an age range) associated with the first user (e.g., 20 years old and/or between 18 and 25 years old, for example). Alternatively and/or additionally, the first demographic information may comprise one or more locations associated with the first user (e.g., a city of residence associated with the first user, a workplace location associated with the first user, a location corresponding to the first client device and/or a network that the first client device is connected to, etc.). Alternatively and/or additionally, the first demographic information may comprise one or more primary languages associated with the first user (and/or the first user account) (e.g., the first user may be familiar with and/or may have a language preference for the one or more primary languages).

In some examples, the first demographic information may be determined based upon the first user activity. For example, the first user activity and/or the first activity information may be analyzed to determine the age and/or the age range associated with the first user. For example, content consumed using the first client device and/or the one or more client devices may be analyzed to determine the age and/or the age range of the first user (e.g., the age and/or the age range may be determined based upon a determined target audience associated with the content consumed using the first client device and/or the one or more client devices). Alternatively and/or additionally, social media posts posted by the first client device and/or the one or more client devices may be analyzed to determine the age and/or the age range of the first user by identifying an indication of the age and/or the age range within a social media post. Alternatively and/or additionally, emails and/or messages transmitted and/or received using the first client device and/or the one or more client devices may be analyzed to determine the age and/or the age range by identifying an indication of the age and/or the age range within an email and/or a message.

In some examples, the one or more locations may be determined based upon a client location of the first client device. For example, the client location may be received from the first client device and/or from a wireless network (e.g., a WiFi network, a hotspot, a wireless access point (WAP), a network associated with a base station, etc.) that the client device is connected to. Alternatively and/or additionally, the first user activity and/or the first activity information may be analyzed to determine the one or more locations associated with the first user. For example, social media posts posted by the first client device and/or the one or more client devices may be analyzed to determine the one or more locations by identifying one or more indications of the one or more locations within a social media post. Alternatively and/or additionally, emails and/or messages transmitted and/or received using the first client device and/or the one or more client devices may be analyzed to determine the one or more locations by identifying one or more indications of the one or more locations within an email and/or a message. In some examples, an identification of a location may be based upon a "tagging" of a location in a social media post, an email and/or a message, a textual mention of a location in a social media post, an email and/or a message, and/or a determination that an image included in and/or linked to a social media post, an email and/or a message is associated with a location (e.g., an image recognition-based determination that may be made by performing one or more image recognition techniques on the image).

Alternatively and/or additionally, the first user activity and/or the first activity information may be analyzed using one or more language detection techniques (and/or algorithms) to determine the one or more primary languages (e.g., English, French, German, Japanese, etc.) associated with the first user. For example, content consumed using the first client device and/or the one or more client devices may be analyzed using one or more language detection techniques (and/or algorithms) to determine the one or more primary languages associated with the first user (e.g., the one or more primary languages may be determined based upon one or more languages associated with the content consumed using the first client device and/or the one or more client devices). Alternatively and/or additionally, social media posts posted by the first client device and/or the one or more client devices may be analyzed using one or more language detection techniques (and/or algorithms) to determine the one or more primary languages by identifying one or more social media posts associated with the one or more primary languages. Alternatively and/or additionally, emails and/or messages transmitted and/or received using the first client device and/or the one or more client devices may be analyzed using one or more language detection techniques (and/or algorithms) to determine the one or more primary languages by identifying one or more emails and/or one or more messages associated with the one or more primary languages.

Alternatively and/or additionally, the age and/or the age range, the one or more locations and/or the one or more primary languages may be user defined. For example, the age and/or the age range, the one or more locations and/or the one or more primary languages may be selected and/or inputted via one or more selectable inputs of the first content interface (and/or a content interface of the one or more content interfaces).

In some examples, the first interest information may comprise one or more interests associated with the first user account (and/or the first client device). For example, each interest of the one or more interests may correspond to a topic (e.g., a subject, a field of interest, etc.) and/or a type of content (e.g., videos, articles, audio, etc.) that the first user has an interest in. In some examples, content consumed using the first client device and/or the one or more client devices may be analyzed to determine the one or more interests (e.g., the content may be analyzed to determine one or more topics associated with the content). Alternatively and/or additionally, social media posts posted by the first client device and/or the one or more client devices may be analyzed to determine the one or more interests. Alternatively and/or additionally, emails and/or messages transmitted and/or received using the first client device and/or the one or more client devices may be analyzed to determine the one or more interests.

Alternatively and/or additionally, the one or more interests may be user defined. For example, the one or more interests may be selected (from a list of topics and/or types of content) and/or inputted via one or more selectable inputs of the first content interface (and/or a content interface of the one or more content interfaces).

At 406, a request for content may be received from a second client device associated with the first user account. For example, the request for content may be received responsive to the second client device accessing a resource (e.g., an internet resource, such as one or more of a web page of a website, an application, a game, etc.) associated with the content system. For example, the second client device may transmit a request to access the resource to a first server associated with the resource. Responsive to the first server receiving the request to access the resource, the first server may transmit the request for content to the content system (and/or to a second server associated with the content system). In some examples, the request for content may be a request to be provided with a content item (e.g., an advertisement, an image, a link, a video, etc.) (for presentation via the resource).

At 408, the resource associated with the request for content may be determined based upon the request for content. For example, the request for content may comprise an indication of the resource (e.g., the request for content may comprise an indication of a web page associated with the resource, such as a web address (e.g., a uniform resource locator (URL)), the request for content may comprise an indication of an application associated with the resource and/or the request for content may comprise an indication of a game associated with the resource).

At 410, the user profile database may be analyzed based upon the first user profile to identify a set of user profiles similar to the first user profile. In some examples, a second user profile may be determined to be similar to the first user profile based upon a determination that (at least) a portion of the first activity information associated with the first user profile matches (at least) a portion of second activity information associated with the second user profile. For example, the second user profile may be selected for inclusion in the set of user profiles responsive to identifying one or more matching content items (e.g., one or more of one or more emails, one or more messages, one or more articles, one or more videos, one or more audio files, one or more images, one or more web pages, etc.) in (both) the first activity information and the second activity information.

Alternatively and/or additionally, the second user profile may be selected for inclusion in the set of user profiles responsive to a determination that the one or more matching content items meet a matching content item threshold. For example, the matching content item threshold may correspond to a threshold quantity of matching content items (e.g., if a quantity of matching content items of the one or more matching content items is greater than and/or equal to the threshold quantity of matching content items, the one or more matching content items may meet the threshold quantity of matching content items). Alternatively and/or additionally, the matching content item threshold may correspond to a threshold proportion of matching content items (e.g., the one or more matching content items may meet the threshold proportion of matching content items if a proportion of the one or more matching content items with respect to (accessed and/or consumed) content items of the first activity information is greater than and/or equal to the threshold proportion of matching content items and/or if a proportion of the one or more matching content items with respect to (accessed and/or consumed) content items of the second activity information is greater than and/or equal to the threshold proportion of matching content items).

In some examples, the second user profile may be selected for inclusion in the set of user profiles responsive to identifying one or more matching queries (e.g., inputted into the search interface and/or a different search interface) in (both) the first activity information and the second activity information. Alternatively and/or additionally, the second user profile may be selected for inclusion in the set of user profiles responsive to a determination that the one or more matching queries meet a matching query threshold. For example, the matching query threshold may correspond to a threshold quantity of matching queries (e.g., if a quantity of matching queries of the one or more matching queries is greater than and/or equal to the threshold quantity of matching queries, the one or more matching queries may meet the threshold quantity of matching queries). Alternatively and/or additionally, the matching query threshold may correspond to a threshold proportion of matching queries (e.g., the one or more matching queries may meet the threshold proportion of matching queries if a proportion of the one or more matching queries with respect to queries of the first activity information is greater than and/or equal to the threshold proportion of matching queries and/or if a proportion of the one or more matching queries with respect to queries of the second activity information is greater than and/or equal to the threshold proportion of matching queries).

Alternatively and/or additionally, the second user profile may be determined to be similar to the first user profile based upon a determination that (at least) a portion of the first demographic information associated with the first user profile matches (at least) a portion of second demographic information associated with the second user profile. For example, the second user profile may be selected for inclusion in the set of user profiles responsive to a determination that the age (and/or the age range) associated with the first user profile matches a second age (and/or a second age range) associated with the second user profile (and/or that a difference between the age and/or the second age is less than a threshold age difference).

Alternatively and/or additionally, the second user profile may be selected for inclusion in the set of user profiles responsive to a determination that a location of the one or more locations associated with the first user profile matches (and/or is within a threshold distance from) a second location associated with the second user profile. Alternatively and/or additionally, the second user profile may be selected for inclusion in the set of user profiles responsive to a determination that a primary language of the one or more primary languages associated with the first user profile matches a second primary language associated with the second user profile.

Alternatively and/or additionally, the second user profile may be determined to be similar to the first user profile based upon a determination that (at least) a portion of the first interest information associated with the first user profile matches (at least) a portion of second interest information associated with the second user profile. For example, the second user profile may be selected for inclusion in the set of user profiles responsive to identifying one or more matching interests in (both) the first interest information and second interest information associated with the second user profile.

Alternatively and/or additionally, the second user profile may be selected for inclusion in the set of user profiles responsive to a determination that the one or more matching interests meet a matching interest threshold. For example, the matching interest threshold may correspond to a threshold quantity of matching interests (e.g., if a quantity of matching interests of the one or more matching interests is greater than and/or equal to the threshold quantity of matching interests, the one or more matching interests may meet the threshold quantity of matching interests). Alternatively and/or additionally, the matching interest threshold may correspond to a threshold proportion of matching interests (e.g., the one or more matching interests may meet the threshold proportion of matching interests if a proportion of the one or more matching interests with respect to interests of the first interest information is greater than and/or equal to the threshold proportion of matching interests and/or if a proportion of the one or more matching interests with respect to interests of the second interest information is greater than and/or equal to the threshold proportion of matching interests).

At 412, a relevance score may be generated based upon the resource, the set of user profiles and/or the first user profile. In some examples, the relevance score may correspond to a measure of probability (e.g., likeliness) that the first user and/or users associated with the set of user profiles would (knowingly) access the resource and/or a probability (e.g., likeliness) that the request to access the resource and/or the request for content are not transmitted as a result of malicious activity (e.g., one or more hacking techniques that may be associated with a computer virus, malware, a Trojan horse, etc.) which may result in the second client device being controlled to transmit the request to access the resource and/or the request for content without the first user's knowing and/or intent.

In some examples, a first set of topics associated with the resource may be determined (e.g., the resource may be analyzed to determine the first set of topics). In some examples, the first set of topics may correspond to subject matter (expressed, covered, etc.) in the resource (e.g., Children-friendly topic, Health Information, Religion, The Economy, Politics, Business News, The United States, International News, The White House, Entertainment, Celebrity News, Science News, Technology, Health News, Travel destinations, Cuisine, Transportation, Cost-friendliness, Asia Tourism, South America Tourism, Africa Tourism, Cartoon, etc.). Alternatively and/or additionally, the set of user profiles and/or the first user profile may be analyzed based upon the first set of topics to identify one or more first user profiles associated with the first set of topics. For example, each user profile of the one or more first user profiles may be indicative of one or more interests matching one or more topics of the first set of topics (e.g., interest information of each user profile of the one or more first user profiles may be indicative of one or more interests matching one or more topics of the first set of topics). In some examples, the relevance score may be generated based upon a first quantity of user profiles of the one or more first user profiles.

Alternatively and/or additionally, the relevance score may be generated based upon a first proportion of the one or more first user profiles with respect to a first plurality of user profiles comprising the first set of user profiles and/or the first user profile. In some examples, the first proportion may correspond to a proportion, a percentage, a ratio, etc. associated with the one or more first user profiles and the first plurality of user profiles. For example, the first proportion may be determined by performing one or more mathematical operations using the first quantity of user profiles and/or a total quantity of user profiles of the first plurality of user profiles (e.g., the one or more mathematical operations may comprise dividing the first quantity of user profiles by the total quantity of user profiles, for example).

In some examples, a higher value of the first quantity of user profiles and/or a higher value of the first proportion may correspond to a higher value of the relevance score. In a first example, the first quantity of user profiles may be equal to a first value, the first proportion may be equal to a second value and/or the relevance score may be equal to a third value. In a second example, the first quantity of user profiles may be equal to a fourth value, the second proportion may be equal to a fifth value and/or the relevance score may be equal to a sixth value. In some examples, if the first value and/or the second value (associated with the first quantity of user profiles and/or the first proportion in the first example) are greater than the fourth value and/or the fifth value (associated with the first quantity of user profiles and/or the first proportion in the second example), the third value (associated with the relevance score in the first example) may be greater than the sixth value (associated with the relevance score in the second example).

In an example, it may be determined that the resource is associated with a first exemplary topic (e.g., the resource may be a blog post associated with Asian cooking and/or the first exemplary topic may be "Asian Cuisine"). Alternatively and/or additionally, the set of user profiles and/or the first user profile may be analyzed based upon the first exemplary topic to identify one or more first exemplary user profiles associated with the first exemplary topic (e.g., each user profile of the one or more first exemplary user profiles may be indicative of an interest corresponding to the first exemplary topic). In some examples, the relevance score may be generated based upon a first exemplary quantity of user profiles of the one or more first exemplary user profiles. Alternatively and/or additionally, the relevance score may be generated based upon a first exemplary proportion of the one or more first exemplary user profiles with respect to the first plurality of user profiles.

In some examples, a type of content (e.g., video, audio, news article, research paper, etc.) associated with the resource may be determined. Alternatively and/or additionally, the set of user profiles and/or the first user profile may be analyzed based upon the type of content to identify one or more second user profiles associated with the type of content. For example, each user profile of the one or more second user profiles may be indicative of an interest matching the type of content. In some examples, the relevance score may be generated based upon a second quantity of user profiles of the one or more second user profiles. Alternatively and/or additionally, the relevance score may be generated based upon a second proportion of the one or more second user profiles with respect to the first plurality of user profiles. In some examples, a higher value of the second quantity of user profiles and/or a higher value of the second proportion may correspond to a higher value of the relevance score.

Alternatively and/or additionally, the set of user profiles and/or the first user profile may be analyzed based upon the resource to identify one or more third user profiles associated with the resource. For example, each user profile of the one or more third user profiles may be indicative of the resource (e.g., activity information of each user profile of the one or more third user profiles may be indicative of the resource). For example, each user profile of the one or more third user profiles may be associated with a client device and/or a user account that has (previously) accessed the resource. In some examples, the relevance score may be generated based upon a third quantity of user profiles of the one or more third user profiles. Alternatively and/or additionally, the relevance score may be generated based upon a third proportion of the one or more third user profiles with respect to the first plurality of user profiles. In some examples, a higher value of the third quantity of user profiles and/or a higher value of the third proportion may correspond to a higher value of the relevance score.

Alternatively and/or additionally, the resource may be analyzed to determine one or more first languages associated with the resource. For example, the resource (e.g., a web page of a website, an application, a game, etc.) may be analyzed using one or more language detection techniques (and/or algorithms) to determine the one or more first languages. In some examples, the one or more first languages may be compared with the one or more primary languages (associated with the first user profile) to determine whether a language of the one or more first languages matches a language of the one or more primary languages. The relevance score may be generated based upon whether a language of the one or more first languages (associated with the resource) matches a language of the one or more primary languages.

Alternatively and/or additionally, the set of user profiles and/or the first user profile may be analyzed based upon the one or more first languages (associated with the resource) to identify one or more fourth user profiles associated with the one or more first languages. For example, each user profile of the one or more fourth user profiles may be indicative of one or more languages of the one or more first languages. In some examples, the relevance score may be generated based upon a fourth quantity of user profiles of the one or more fourth user profiles. Alternatively and/or additionally, the relevance score may be generated based upon a fourth proportion of the one or more fourth user profiles with respect to the first plurality of user profiles. In some examples, a higher value of the fourth quantity of user profiles and/or a higher value of the fourth proportion may correspond to a higher value of the relevance score.

At 414, the relevance score may be compared with a threshold relevance (e.g., a threshold relevance score) to determine whether the request for content is fraudulent. For example, a determination that the request for content is fraudulent may be associated with a determination that the request for content is transmitted (by the second client device, the first server and/or a different client device) as a result of malicious activity (e.g., one or more hacking techniques associated with a computer virus, malware, a Trojan horse, etc.) performed by a malicious entity. For example, the resource may be accessed and/or the request for content may be transmitted without the first user intending to access the resource (e.g., the request to access the resource and/or the request for content may be transmitted by the second client device without the first user's knowing and/or consent).

In some examples, it may be determined that the request for content is not fraudulent responsive to a determination that the relevance score is higher (and/or lower) than the threshold relevance. Alternatively and/or additionally, it may be determined that the request for content is not fraudulent responsive to a determination that the relevance score is lower (and/or higher) than the threshold relevance.

Alternatively and/or additionally, an expected behavior associated with the first user account (and/or the first user) may be determined using one or more (predictive) machine learning techniques and/or models. For example, the expected behavior may be determined based upon the first user profile and/or the set of user profiles. In some examples, the expected behavior may be indicative of one or more of one or more topics, one or more types of content, one or more languages, one or more resources, etc. that are associated with the first user profile and/or the set of user profiles. For example, it may be expected that the first user account (and/or the first user) accesses resources (e.g., web pages, applications, etc.) associated with the expected behavior.

Alternatively and/or additionally, a second behavior associated with the resource may be determined using one or more (predictive) machine learning techniques and/or models. For example, the second behavior may be determined based upon a second plurality of user profiles associated with client devices and/or user accounts that accessed the resource. In some examples, the second behavior may be indicative of one or more of one or more topics, one or more types of content, one or more languages, one or more accessed resources, etc. that are associated with the second plurality of user profiles.

In some examples, a difference between the expected behavior and the second behavior may be determined. For example, the difference may be associated with a deviation of the expected behavior from the second behavior (e.g., the difference may be associated with sigma). Alternatively and/or additionally, the relevance score may be indicative of the difference and/or the threshold relevance may be indicative of a threshold difference (and/or a threshold deviation). For example, it may be determined that the request for content is not fraudulent responsive to a determination that the relevance score (e.g., the difference) is lower than the threshold relevance (e.g., the threshold difference). Alternatively and/or additionally, it may be determined that the request for content is fraudulent responsive to a determination that the relevance score (e.g., the difference) is higher than the threshold relevance (e.g., the threshold difference)

In an example, the expected behavior may be associated with accessing a first type of content associated with a first topic (e.g., videos about teaching children) in English and/or the second behavior may be associated with accessing a second type of content associated with a second topic (e.g., articles about designing motor vehicles) in Spanish (and/or the second behavior may not be associated with the first type of content associated with the first topic (e.g., videos about teaching children) in English). Accordingly, the relevance score (e.g., the difference between the expected behavior and the second behavior) may be higher than the threshold relevance (e.g., the threshold difference and/or the threshold deviation) and/or it may be determined that the request for content is fraudulent.

In some examples, responsive to a determination that the request for content is not fraudulent, a first content item may be transmitted to the second client device (and/or may be provided to the second client device for presentation via the resource). In some examples, the first content item may be one or more of an advertisement, an image, a link, a video, etc. Alternatively and/or additionally, the first content item may be displayed on one or more locations of the resource (e.g., if the resource is a web page, the first content item may be displayed and/or presented on one or more locations of the web page and/or if the resource is an application, the first content item may be displayed and/or presented on one or more locations of the application, for example).

Alternatively and/or additionally, the first content item may be selected, for transmission to the second client device and/or for presentation via the resource, from a third plurality of content items based upon the first user profile. For example, the third plurality of content items may correspond to content items (participating) in an auction associated with a bidding system (e.g., a real-time bidding system, for example, and/or a different type of bidding system) for selecting a content item from the third plurality of content items for presentation via the resource. For example, the first content item may be selected from the third plurality of content items based upon a determination that the first content item is associated with a highest bid value of a plurality of bid values associated with the third plurality of content items. Alternatively and/or additionally, the first content item may be selected from the third plurality of content items based upon a determination that the first content item is associated with a highest predicted probability of the first user positively engaging with the first content item (of a plurality of predicted probabilities associated with the third plurality of content items).

Alternatively and/or additionally, responsive to a determination that the request for content is fraudulent, the first content item (and/or any content item associated with the request for content) may not be transmitted to the second client device (and/or may not be displayed and/or presented via the resource). Alternatively and/or additionally, responsive to the determination that the request for content is fraudulent, the request for content may be discarded (and/or deleted).

Alternatively and/or additionally, responsive to the determination that the request for content is fraudulent, an indication that the request for content is determined to be fraudulent may be submitted to the bidding system. A second content item may be selected from a fourth plurality of content items (participating) in an auction associated with the bidding system for selecting a content item from the fourth plurality of content items for presentation via the resource. For example, an average of a second plurality of bid values associated with the fourth plurality of content items may be lower than an average of the plurality of bid values associated with the third plurality of content items (as a result of the request for content being labeled as fraudulent). For example, the second plurality of bid values may be generated based upon the request for content being determined to be fraudulent.

Alternatively and/or additionally, a fraud probability associated with the request for content may be determined based upon the relevance score. For example, the fraud probability may be indicative of a probability (and/or a likeliness) that the request for content is fraudulent. In some examples, a higher value of the relevance score may correspond to a lower value of the fraud probability. In a first example, the relevance score may be a first exemplary relevance score and/or the fraud probability may be a first exemplary fraud probability. In a second example, the relevance score may be a second exemplary relevance score and/or the fraud probability may be a second exemplary fraud probability. The first exemplary relevance score may be higher than the second exemplary relevance score. Accordingly, the first exemplary fraud probability may be lower than the second exemplary fraud probability.

Alternatively and/or additionally, a higher value of the relevance score may correspond to a higher value of the fraud probability. In a first example, the relevance score may be a third exemplary relevance score and/or the fraud probability may be a third exemplary fraud probability. In a second example, the relevance score may be a fourth exemplary relevance score and/or the fraud probability may be a fourth exemplary fraud probability. The third exemplary relevance score may be higher than the fourth exemplary relevance score. Accordingly, the third exemplary fraud probability may be higher than the fourth exemplary fraud probability.

In some examples, an indication of the fraud probability may be submitted to the bidding system and/or a third plurality of bid values may be generated based upon the fraud probability. In some examples, the third plurality of bid values may be associated with a fifth plurality of content items (participating) in an auction associated with the bidding system for selecting a content item from the fifth plurality of content items for presentation via the resource.

In some examples, the first client device may be the same as the second client device. Alternatively and/or additionally, the first client device may be different than the second client device.

It may be appreciated that the first user profile may not be associated with the first user account. For example, the first user profile may be associated with the first client device. Alternatively and/or additionally, the first user profile may be indicative of the first client device. For example, the first user profile may comprise first information associated with the first client device and/or a network that the first client device is connected to. The first information may comprise one or more of device identification information, carrier information, an IP address, etc. associated with the first client device and/or the network that the first client device is connected to.

Alternatively and/or additionally, the request for content and/or the request to access the resource may be transmitted by the first client device. In some examples, the request for content may comprise an indication of the first client device. For example, the request for content may comprise second information associated with the first client device and/or the network that the first client device is connected to. For example, the second information may comprise one or more of the device identification information, the carrier information, the IP address, etc. associated with the first client device and/or the network that the first client device is connected to. Responsive to receiving the request for content, the first user profile may be identified as being associated with the request for content based upon the first information (comprised within the first user profile) and/or the second information (comprised within the request for content).

Figure 5A:
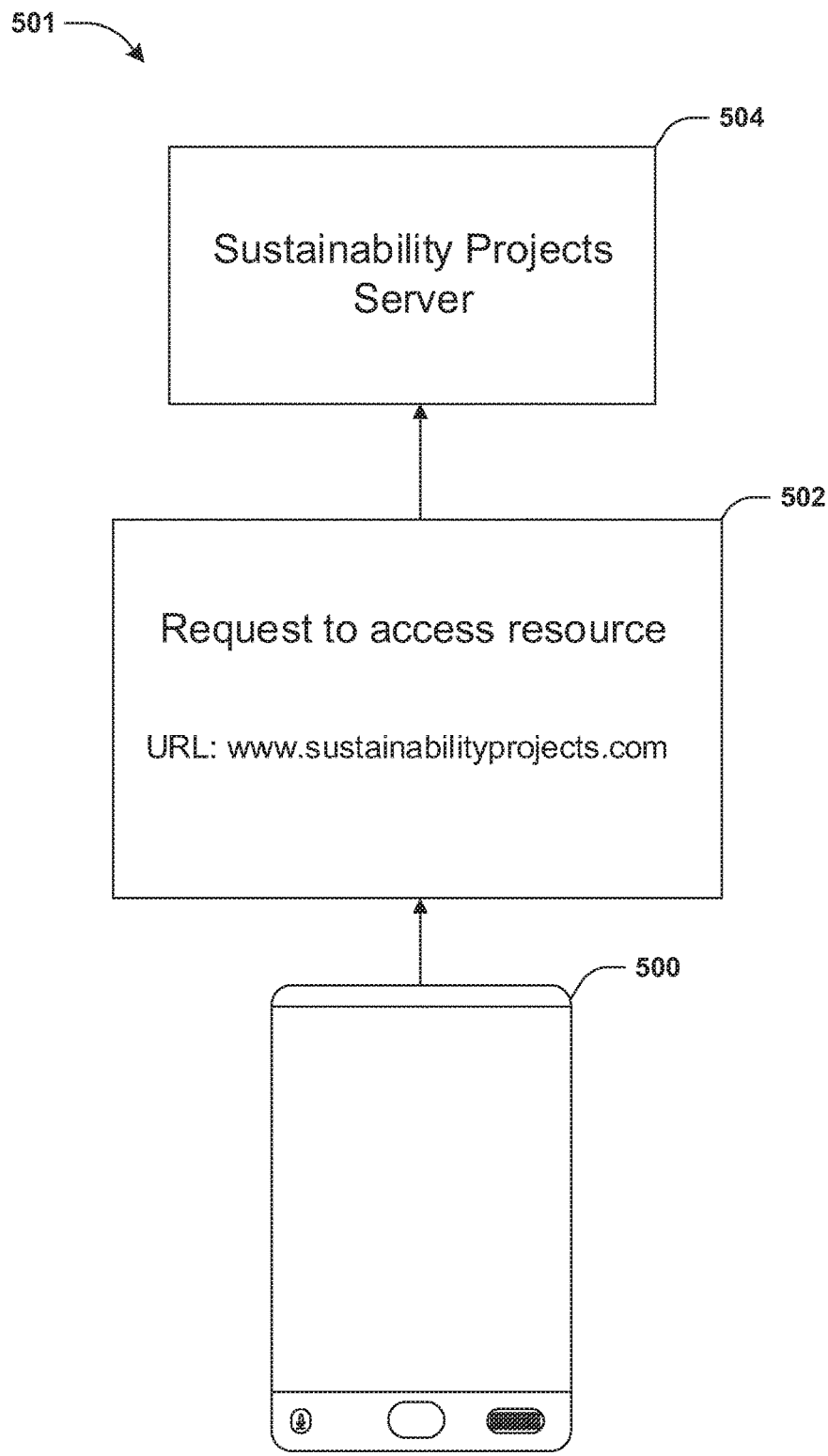
FIG. 5A is a component block diagram illustrating an example system for determining whether requests for content are fraudulent, where a first client device transmits a request to access a resource to a first server.
Figure 5B:
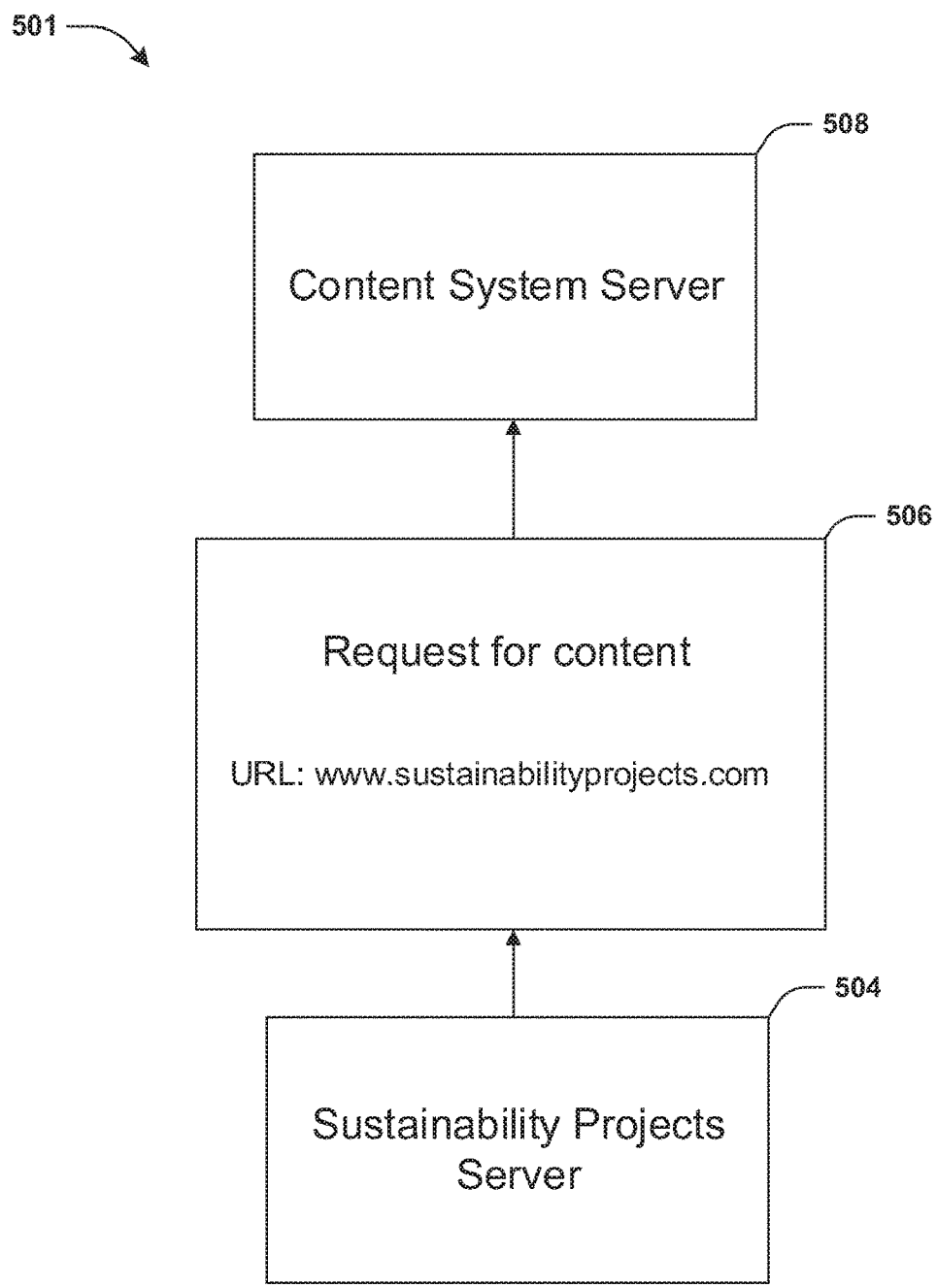
FIG. 5B is a component block diagram illustrating an example system for determining whether requests for content are fraudulent, where a first server transmits a request for content to a second server associated with a content system.
Figure 5C:
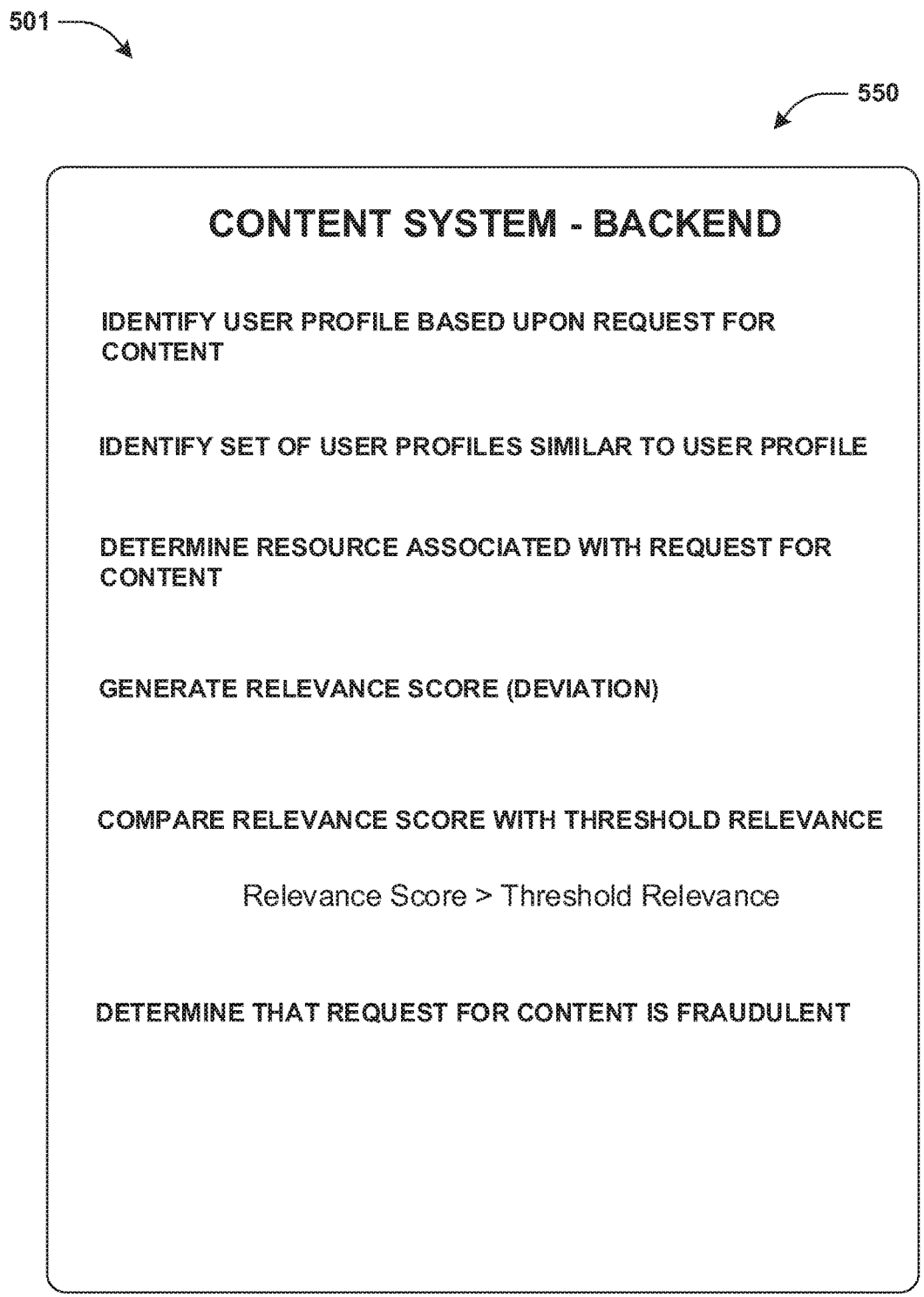
FIG. 5C is a component block diagram illustrating an example system for determining whether requests for content are fraudulent, where a backend system determines whether a request for content is fraudulent.

FIGS. 5A-5C illustrate examples of a system 501 for determining whether requests for content are fraudulent. A first user, such as user Jack, (and/or a first client device 500 associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system.

In some examples, first user activity performed using the first client device 500 may be detected. The first user activity may be monitored and/or analyzed. A first user profile associated with the first client device 500 may be generated.

The first user profile may comprise first activity information associated with the first user activity, first demographic information associated with the first client device 500 and/or first interest information associated with the first client device 500.

FIG. 5A illustrates the first client device 500 transmitting a request to access a resource 502 to a first server 504. In some examples, the resource may correspond to a web page. For example, the request to access the resource 502 may comprise an indication of the web page (e.g., a web address "www.sustainabilityprojects.com"). Alternatively and/or additionally, the first server 504 may be associated with the web page.

FIG. 5B illustrates the first server 504 transmitting a request for content 506 to a second server 508 associated with the content system. In some examples, the request for content 506 may be transmitted (by the first server 504) responsive to receiving the request to access the resource 502. Alternatively and/or additionally, the request for content 506 may be transmitted (to the second server 508) by the first client device 500. In some examples, the request for content 506 may be a request to be provided with a content item (e.g., an advertisement, an image, a link, a video, etc.) (for presentation via the resource).

FIG. 5C illustrates a backend system 550 (of the content system) determining whether the request for content 506 is fraudulent. For example, the first user profile may be identified based upon the request for content 506. For example, the first user profile may comprise first information associated with the first client device 500 and/or a network that the first client device 500 is connected to. The first information may comprise one or more of device identification information, carrier information, an IP address, etc. associated with the first client device 500 and/or the network that the first client device 500 is connected to. Alternatively and/or additionally, the request for content 506 may comprise second information associated with the first client device 500 and/or the network that the first client device 500 is connected to. For example, the second information may comprise one or more of the device identification information, the carrier information, the IP address, etc. associated with the first client device 500 and/or the network that the first client device 500 is connected to. Responsive to receiving the request for content 506, the first user profile may be identified as being associated with the request for content 506 based upon the first information (comprised within the first user profile) and/or the second information (comprised within the request for content 506).

Alternatively and/or additionally, a set of user profiles similar to the first user profile may be identified. For example, a user profile database may be analyzed based upon the first user profile to identify the set of user profiles. User profiles may be selected for inclusion in the set of user profiles based upon the first activity information associated with the first user activity, the first demographic information associated with the first client device 500 and/or the first interest information associated with the first client device 500.

Alternatively and/or additionally, the resource associated with the request for content 506 may be determined based upon the request for content 506. For example, the request for content 506 may comprise an indication of the resource (e.g., the request for content 506 may comprise the web address "www.sustainabilityprojects.com").

In some examples, an expected behavior associated with the first client device 500 may be determined using one or more (predictive) machine learning techniques and/or models. For example, the expected behavior may be determined based upon the first user profile and/or the set of user profiles. In some examples, the expected behavior may be indicative of one or more of one or more topics, one or more types of content, one or more languages, one or more resources, etc. that are associated with the first user profile and/or the set of user profiles.

Alternatively and/or additionally, a second behavior associated with the resource may be determined using one or more (predictive) machine learning techniques and/or models. For example, the second behavior may be determined based upon a second plurality of user profiles associated with client devices and/or user accounts that accessed the resource. In some examples, the second behavior may be indicative of one or more of one or more topics, one or more languages, one or more accessed resources, etc. that are associated with the second plurality of user profiles.

In some examples, a relevance score may be generated based upon the expected behavior and/or the second behavior. For example, the relevance score may correspond to a difference between the expected behavior and the second behavior. Alternatively and/or additionally, the relevance score may be associated with a deviation of the expected behavior from the second behavior.

Alternatively and/or additionally, the relevance score may be compared with a threshold relevance (e.g., a threshold difference and/or a threshold deviation). For example, it may be determined that the relevance score is greater than the threshold relevance. In some examples, responsive to determining that the relevance score is greater than the threshold relevance, it may be determined that the request for content 506 is fraudulent.

In an example, the expected behavior may be associated with accessing a first type of content associated with a first topic (e.g., cartoon videos for children) in Spanish and/or the second behavior may be associated with accessing a second type of content associated with a second topic (e.g., articles about sustainability) in English (and/or the second behavior may not be associated with accessing the first type of content associated with the first topic). Accordingly, the relevance score (e.g., the difference between the expected behavior and the second behavior) may be higher than the threshold relevance (e.g., the threshold difference and/or the threshold deviation) and/or it may be determined that the request for content 506 is fraudulent.

In some examples, responsive to determining that the request for content 506 is fraudulent, a content item associated with the request for content 506 may not be transmitted to the first client device 500. Alternatively and/or additionally, responsive to determining that the request for content 506 is fraudulent, the request for content 506 may be discarded (and/or deleted).

FIGS. 6A-6F illustrate examples of a system 601 for determining whether requests for content are fraudulent. A first user, such as user Jennifer, (and/or a first client device 600 associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system.

In some examples, first user activity performed using the first client device 600 may be detected. The first user activity may be monitored and/or analyzed. A first user profile associated with the first client device 600 may be generated. The first user profile may comprise first activity information associated with the first user activity, first demographic information associated with the first client device 600 and/or first interest information associated with the first client device 600.

Figure 6A:
FIG. 6A is a component block diagram illustrating an example system for determining whether requests for content are fraudulent, where a first client device presents and/or accesses a first web page using a browser of the first client device.

FIG. 6A illustrates the first client device 600 presenting and/or accessing a first web page 608 using a browser of the first client device 600. The browser may comprise an address bar 602 comprising a web address (e.g., a URL) of the first web page 608. The first web page 608 may comprise a search interface. For example, the search interface may comprise a web search engine designed to search for information throughout the internet. In some examples, the first web page 608 may comprise a search field 606. For example, a query "stock market" may be entered into the search field 606. In some examples, the first web page 608 may comprise a search selectable input 604 corresponding to performing a search based upon the query. For example, the search selectable input 604 may be selected.

Figure 6B:
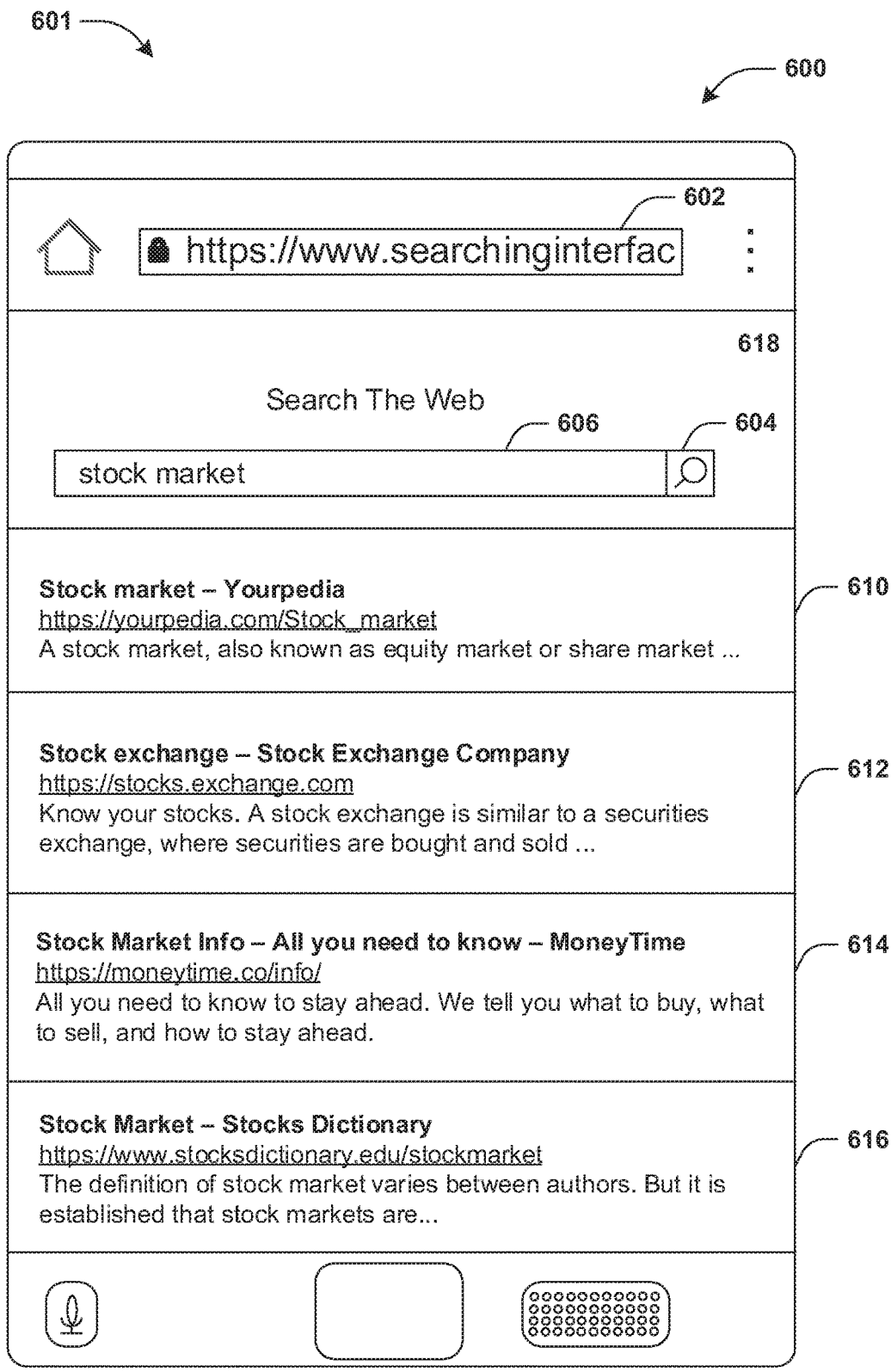
FIG. 6B is a component block diagram illustrating an example system for determining whether requests for content are fraudulent, where a first client device presents a plurality of search results associated with a query using a browser of the first client device.

FIG. 6B illustrates the first client device 600 presenting a plurality of search results associated with the query using the browser of the first client device 600. For example, the plurality of search results may be presented within a second web page 618. For example, the plurality of search results may comprise a first search result 610 corresponding to a third web page, a second search result 612 corresponding to a fourth web page 620 (illustrated in FIG. 6F), a third search result 614 corresponding to a fifth web page and/or a fourth search result 616 corresponding to a sixth web page.

In some examples, each search result of the plurality of search results may comprise a selectable input (e.g., a link) corresponding to accessing a web page associated with the search result. In some examples, the second search result 612 corresponding to the fourth web page 620 may be selected (e.g., the second search result 612 may be selected via a second selectable input corresponding to the second search result 612).

Figure 6C:
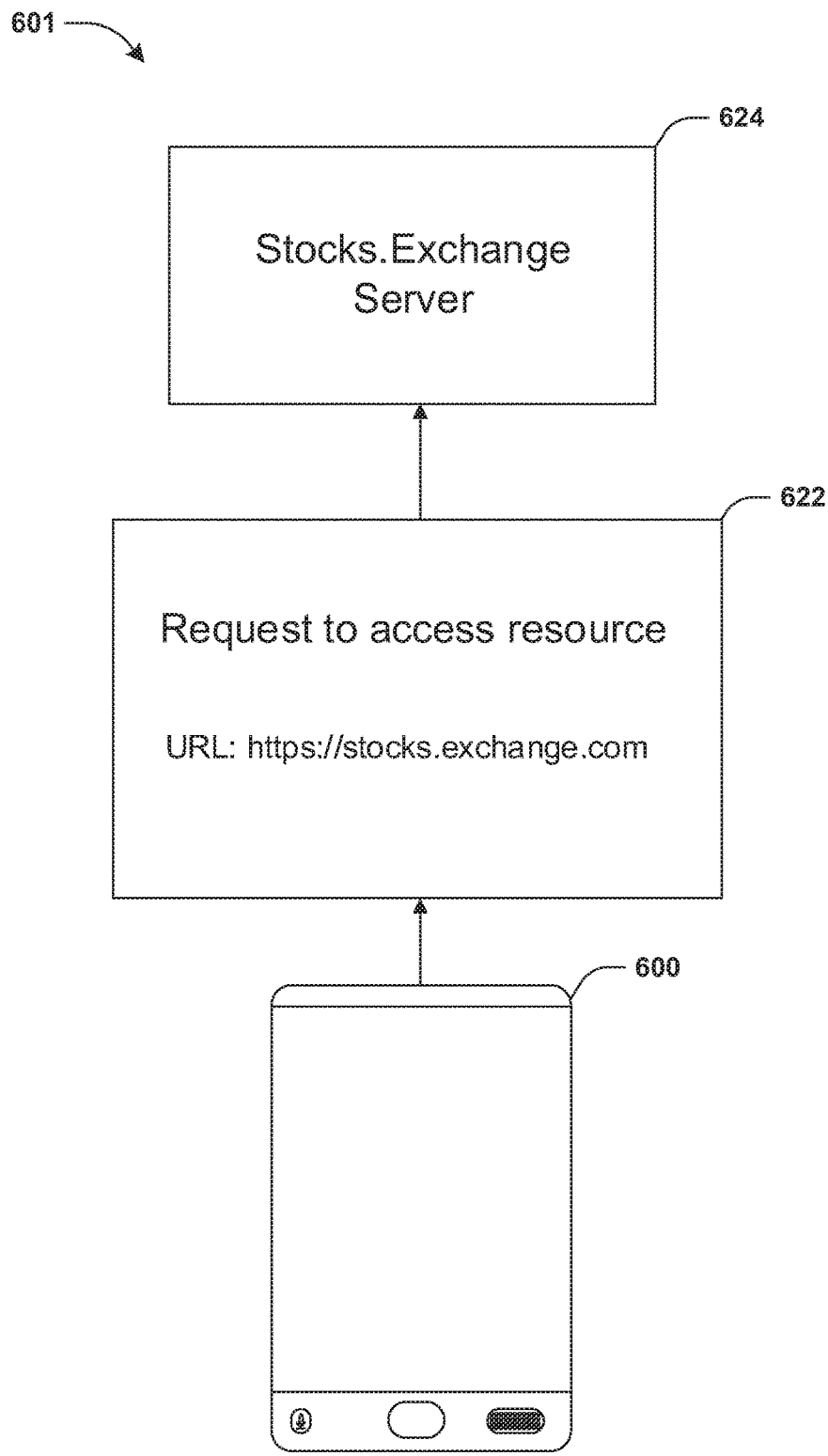
FIG. 6C is a component block diagram illustrating an example system for determining whether requests for content are fraudulent, where a first client device transmits a request to access a resource to a first server.

FIG. 6C illustrates the first client device 600 transmitting a request to access a resource 622 to a first server 624. In some examples, the request to access the resource 622 may be transmitted responsive to the second search result 612 being selected. For example, the resource may correspond to the fourth web page 620. For example, the request to access the resource 622 may comprise an indication of the fourth web page 620 (e.g., a web address "https://stocks.exchange.com"). Alternatively and/or additionally, the first server 624 may be associated with the fourth web page 620.

Figure 6D:
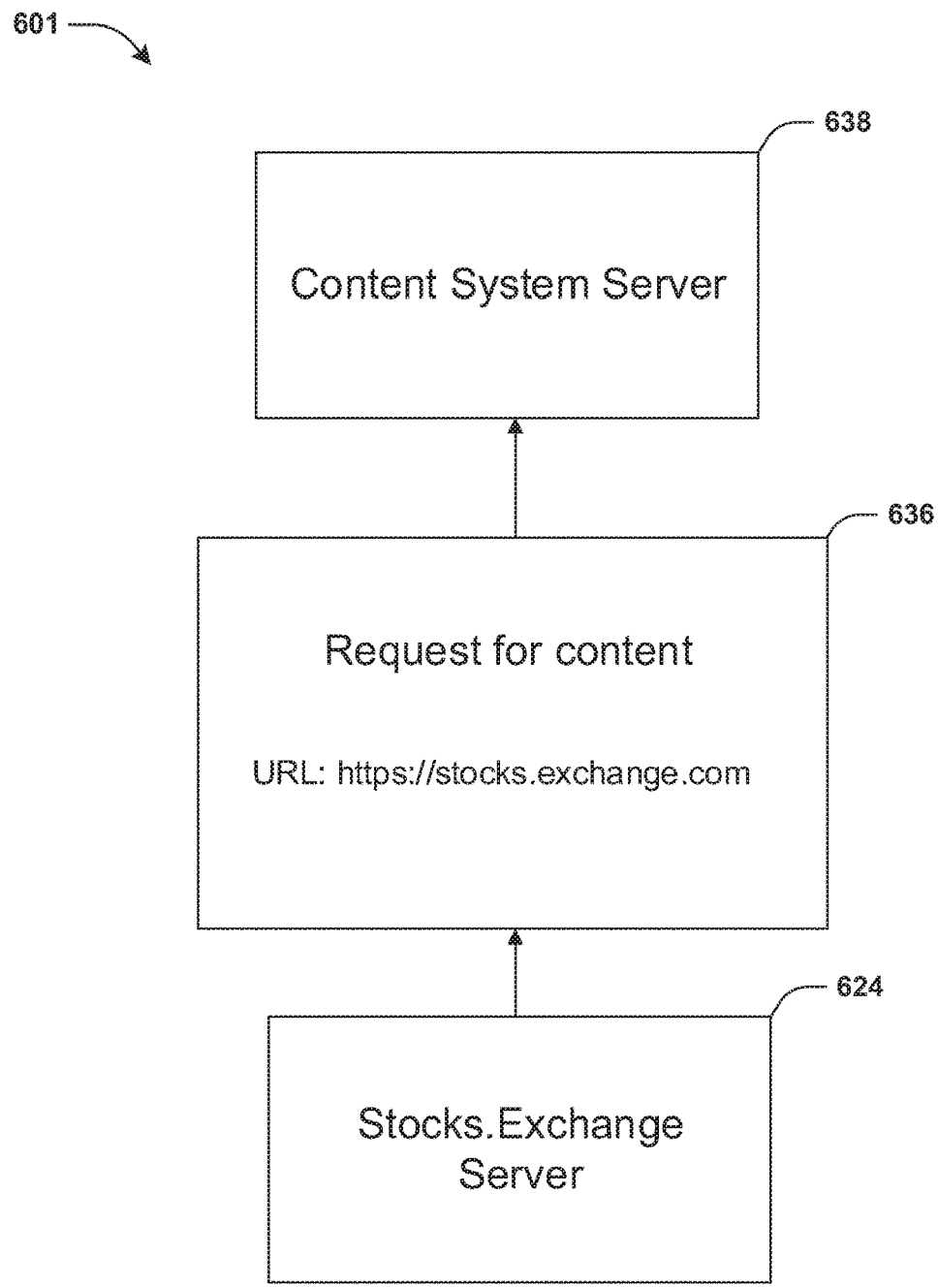
FIG. 6D is a component block diagram illustrating an example system for determining whether requests for content are fraudulent, where a first server transmits a request for content to a second server associated with a content system.

FIG. 6D illustrates the first server 624 transmitting a request for content 636 to a second server 638 associated with the content system. In some examples, the request for content 636 may be transmitted (by the first server 624) responsive to receiving the request to access the resource 622. Alternatively and/or additionally, the request for content 636 may be transmitted (to the second server 638) by the first client device 600. In some examples, the request for content 636 may be a request to be provided with a content item (e.g., an advertisement, an image, a link, a video, etc.) (for presentation via the fourth web page 620).

Figure 6E:
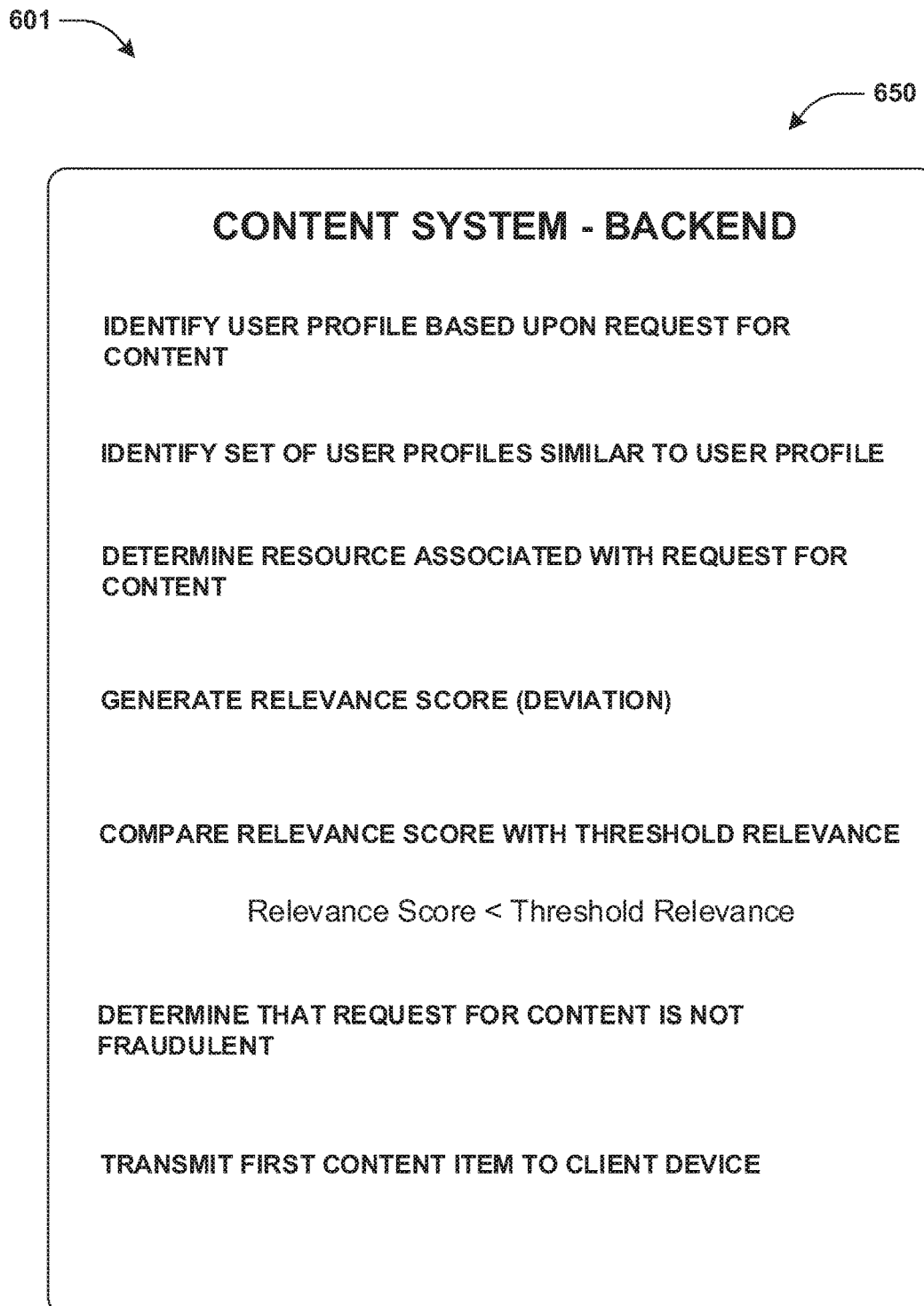
FIG. 6E is a component block diagram illustrating an example system for determining whether requests for content are fraudulent, where a backend system determines whether a request for content is fraudulent.

FIG. 6E illustrates a backend system 650 (of the content system) determining whether the request for content 636 is fraudulent. For example, the first user profile may be identified based upon the request for content 636. For example, the first user profile may comprise first information associated with the first client device 600 and/or a network that the first client device 600 is connected to. The first information may comprise one or more of device identification information, carrier information, an IP address, etc. associated with the first client device 600 and/or the network that the first client device 600 is connected to. Alternatively and/or additionally, the request for content 636 may comprise second information associated with the first client device 600 and/or the network that the first client device 600 is connected to. For example, the second information may comprise one or more of the device identification information, the carrier information, the IP address, etc. associated with the first client device 600 and/or the network that the first client device 600 is connected to. Responsive to receiving the request for content 636, the first user profile may be identified as being associated with the request for content 636 based upon the first information (comprised within the first user profile) and/or the second information (comprised within the request for content 636).

Alternatively and/or additionally, a set of user profiles similar to the first user profile may be identified. For example, a user profile database may be analyzed based upon the first user profile to identify the set of user profiles. User profiles may be selected for inclusion in the set of user profiles based upon the first activity information associated with the first user activity, the first demographic information associated with the first client device 600 and/or the first interest information associated with the first client device 600.

Alternatively and/or additionally, the resource associated with the request for content 636 may be determined based upon the request for content 636. For example, the request for content 636 may comprise an indication of the fourth web page 620 (e.g., the request for content 636 may comprise the web address "https://stocks.exchange.com").

In some examples, an expected behavior associated with the first client device 600 may be determined using one or more (predictive) machine learning techniques and/or models. For example, the expected behavior may be determined based upon the first user profile and/or the set of user profiles. In some examples, the expected behavior may be indicative of one or more of one or more topics, one or more types of content, one or more languages, one or more resources, etc. that are associated with the first user profile and/or the set of user profiles.

Alternatively and/or additionally, a second behavior associated with the fourth web page 620 may be determined using one or more (predictive) machine learning techniques and/or models. For example, the second behavior may be determined based upon a second plurality of user profiles associated with client devices and/or user accounts that accessed the fourth web page 620. In some examples, the second behavior may be indicative of one or more of one or more topics, one or more languages, one or more accessed resources, etc. that are associated with the second plurality of user profiles.

In some examples, a relevance score may be generated based upon the expected behavior and/or the second behavior. For example, the relevance score may correspond to a difference between the expected behavior and the second behavior. Alternatively and/or additionally, the relevance score may be associated with a deviation of the expected behavior from the second behavior.

Alternatively and/or additionally, the relevance score may be compared with a threshold relevance (e.g., a threshold difference and/or a threshold deviation). For example, it may be determined that the relevance score is less than the threshold relevance. In some examples, responsive to determining that the relevance score is less than the threshold relevance, it may be determined that the request for content 636 is not fraudulent.

In an example, the expected behavior may be associated with accessing a first type of content associated with a first topic "finance-related information" in English and/or the second behavior may be associated with accessing content associated with the first topic "finance-related information" in English. Accordingly, the relevance score (e.g., the difference between the expected behavior and the second behavior) may be less than the threshold relevance (e.g., the threshold difference and/or the threshold deviation) and/or it may be determined that the request for content 636 is not fraudulent.

Figure 6F:
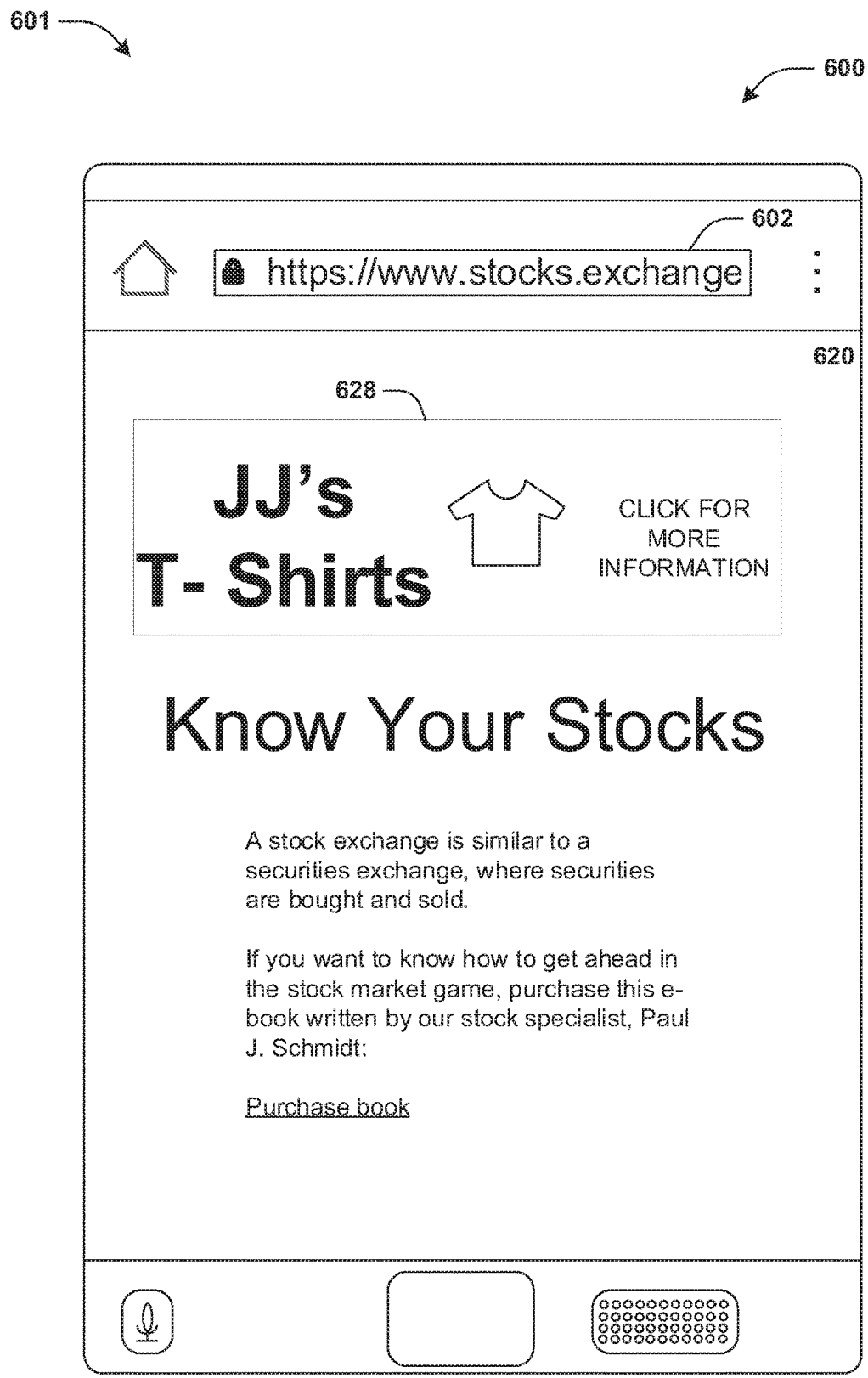
FIG. 6F is a component block diagram illustrating an example system for determining whether requests for content are fraudulent, where a first client device presents and/or accesses a fourth web page using a browser of the first client device.

In some examples, responsive to determining that the request for content 636 is not fraudulent, a content item 628 associated with the request for content 636 may be transmitted to the first client device 600 (for presentation via the fourth web page 620). FIG. 6F illustrates the first client device 600 presenting and/or accessing the fourth web page 620 using the browser of the first client device 600. For example, the content system may provide the content item 628 to be presented via the fourth web page 620 while the fourth web page 620 is accessed by the first client device 600.

It may be appreciated that the disclosed subject matter may prevent fraudulent activity, including, but not limited to, advertisement fraud. For example, by analyzing a user profile of a client device as well as user profiles similar to the user profile to determine whether an advertisement request associated with the client device is fraudulent, fraudulent advertisement requests may be more prevalently and/or more accurately identified and/or discarded.

Further, malicious entities may be discouraged from performing malicious actions (e.g., using one or more hacking techniques, malware, etc.) to control client devices for transmission of advertisement requests because, by implementing one or more of the techniques presented herein, it is more difficult for a malicious entity to successfully control a client device for transmission of a fraudulent advertisement request that is not identified as fraudulent by the content system.

Further, some fraud detecting systems may attempt to identify fraudulent advertisement requests based upon IP addresses associated with the fraudulent advertisement requests (e.g., determining whether the IP addresses are suspicious, determining whether the IP addresses are not residential IP addresses, determining whether the IP addresses are blacklisted, etc.). However, because these fraud detecting systems merely analyze IP addresses associated with advertisement requests (and/or may not analyze user profiles, for example), these fraud detecting systems may not identify fraudulent advertisement requests from client devices (that are not suspicious, for example), where the client devices may be hacked and/or controlled (by malicious entities, for example), resulting in transmission of the fraudulent advertisement requests.

Implementation of at least some of the disclosed subject matter may lead to benefits including, but not limited to, a reduction in transmission of fraudulent advertisement requests (and/or a reduction in bandwidth) (e.g., as a result of discouraging malicious entities from performing malicious actions to control client devices for transmission of advertisement requests).

Alternatively and/or additionally, implementation of at least some of the disclosed subject matter may lead to benefits including a reduction in instances that client devices are hacked and/or controlled for transmission of fraudulent advertisement requests (e.g., as a result of discouraging malicious entities from performing malicious actions to control client devices for transmission of fraudulent advertisement requests).

Alternatively and/or additionally, implementation of at least some of the disclosed subject matter may lead to benefits including preventing unauthorized access of client devices and/or the content system from unauthorized access (e.g., as a result of discouraging malicious entities from performing malicious actions to control client devices for transmission of fraudulent advertisement requests). Alternatively and/or additionally, implementation of at least some of the disclosed subject matter may lead to benefits including decreasing security resources needed to protect client devices and/or the content system from unauthorized access.

Alternatively and/or additionally, implementation of at least some of the disclosed subject matter may lead to benefits including reducing bandwidth (e.g., as a result of identifying fraudulent advertisement requests and/or not transmitting content items associated with the fraudulent advertisement requests to client devices).

Alternatively and/or additionally, implementation of at least some of the disclosed subject matter may lead to benefits including reducing an amount spent by entities (e.g., advertisers) on fraudulent advertisement requests.

In some examples, at least some of the disclosed subject matter may be implemented on a client device, and in some examples, at least some of the disclosed subject matter may be implemented on a server (e.g., hosting a service accessible via a network, such as the Internet).

Figure 7:
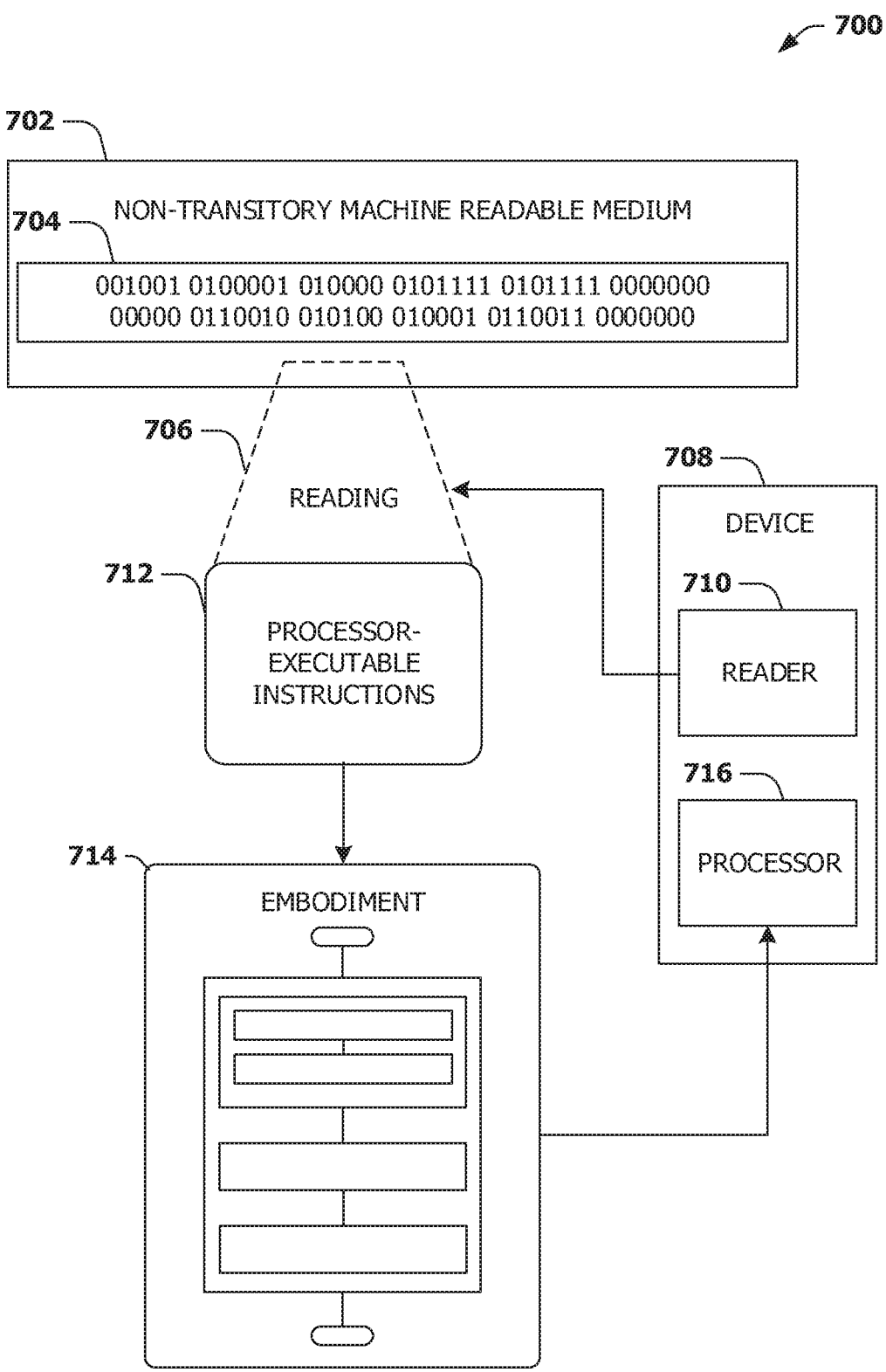
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400 of FIG. 4, for example. In some embodiments, the processor-executable instructions 712 are configured to cause implementation of a system, such as at least some of the example system 501 of FIGS. 5A-5C and/or the example system 601 of FIGS. 6A-6F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   detecting user activity performed using a first device associated with a first user account;
   generating a first user profile associated with the first user account, wherein the first user profile comprises at least one of:
      activity information associated with the user activity;
      demographic information associated with the first user account; or
      interest information associated with the first user account;
   receiving a request for content from a second device associated with the first user account;
   determining, based upon the request for content, a resource associated with the request for content;
   analyzing a user profile database based upon the first user profile to identify a set of user profiles similar to the first user profile and associated with one or more different users than the first user profile;
   generating a relevance score corresponding to a probability that a first user with the first user profile accesses the resource and associated with the request for content, the generating the relevance score based upon (i) the resource determined based upon the request for content, (ii) the set of user profiles similar to the first user profile and associated with one or more different users than the first user profile and (iii) the first user profile associated with the first user account associated with the second device from which the request for content was received;
   determining whether the request for content is fraudulent by comparing:
      the relevance score corresponding to the probability that the first user with the first user profile accesses the resource, associated with the request for content and generated based upon (i) the resource determined based upon the request for content, (ii) the set of user profiles similar to the first user profile and associated with one or more different users than the first user profile and (iii) the first user profile associated with the first user account associated with the second device from which the request for content was received, with a threshold relevance; and
   responsive to a determination that the request for content is fraudulent, at least one of:
      not transmitting a content item, associated with the request for content, to the second device; or
      discarding the request for content,
   wherein at least one of:
      the first user profile indicates one or more languages associated with the first user account: or
      the generating the relevance score comprises:
         determining, based upon the set of user profiles and the first user profile, an expected behavior associated with the first user account using one or more machine learning techniques; and
         determining a difference between the expected behavior and a second behavior associated with the resource, wherein the relevance score is indicative of the difference.

2. The method of claim 1, comprising:
receiving a second request for content from a third device; and
responsive to a determination that the second request for content is not fraudulent, transmitting a second content item, associated with the second request for content, to the third device.

3. The method of claim 2, wherein the second content item is presented via the resource.

4. The method of claim 1, wherein the resource is an internet resource.

5. The method of claim 4, wherein the internet resource corresponds to a web page of a website.

6. The method of claim 4, wherein the internet resource corresponds to an application.

7. The method of claim 4, wherein the internet resource corresponds to a game.

8. The method of claim 1, wherein the first device is the same as the second device.

9. The method of claim 1, wherein the first device is different than the second device.

10. A computing device comprising:
a processor; and
memory comprising processor-executable instructions that when executed by the processor cause performance of operations, the operations comprising:
receiving a request for content from a first device;
identifying a first user profile associated with the first device, wherein the first user profile comprises at least one of:
activity information associated with the first device;
demographic information associated with the first device; or
interest information associated with the first device;
determining, based upon the request for content, a resource associated with the request for content;
analyzing a user profile database based upon the first user profile to identify a set of user profiles similar to the first user profile;
generating a relevance score corresponding to a probability that a first user with the first user profile accesses the resource and associated with the request for content, the generating the relevance score based upon (i) the resource determined based upon the request for content, (ii) the set of user profiles similar to the first user profile and (iii) the first user profile associated with the first device from which the request for content was received;
determining whether the request for content is fraudulent by comparing:
the relevance score corresponding to the probability that the first user with the first user profile accesses the resource, associated with the request for content and generated based upon (i) the resource determined based upon the request for content, (ii) the set of user profiles similar to the first user profile and (iii) the first user profile associated with the first device from which the request for content was received, with a threshold relevance; and
responsive to a determination that the request for content is fraudulent, at least one of:
not transmitting a content item, associated with the request for content, to the first device; or
discarding the request for content, wherein at least one of:
the first user profile indicates one or more languages associated with the first device; or
the generating the relevance score comprises:
determining, based upon the set of user profiles and the first user profile, an expected behavior associated with the first user profile using one or more machine learning techniques; and
determining a difference between the expected behavior and a second behavior associated with the resource, wherein the relevance score is indicative of the difference.

11. The computing device of claim 10, the operations comprising:
receiving a second request for content from a second device; and
responsive to a determination that the second request for content is not fraudulent, transmitting a second content item, associated with the second request for content, to the second device.

12. The computing device of claim 11, wherein the second content item is presented via the resource.

13. The computing device of claim 10, wherein the resource is an internet resource corresponding to at least one of:
a web page of a website; or
an application.

14. The computing device of claim 10, wherein the resource is an internet resource corresponding to a game.

15. A non-transitory machine readable medium having stored thereon processor-executable instructions that when executed cause performance of operations, the operations comprising:
receiving a request for content from a server associated with a resource, wherein the request for content is associated with a first device;
identifying a first user profile associated with the first device, wherein the first user profile comprises at least one of:
activity information associated with the first device;
demographic information associated with the first device; or
interest information associated with the first device;
analyzing a user profile database based upon the first user profile to identify a set of user profiles similar to the first user profile;
generating a relevance score corresponding to a probability that a first user with the first user profile accesses the resource and associated with the request for content, the generating the relevance score based upon (i) the resource associated with the request for content, (ii) the set of user profiles similar to the first user profile and (iii) the first user profile associated with the first device associated with the request for content;
determining whether the request for content is fraudulent by comparing:
the relevance score corresponding to the probability that the first user with the first user profile accesses the resource, associated with the request for content and generated based upon (i) the resource associated with the request for content, (ii) the set of user profiles similar to the first user profile and (iii) the first user profile associated with the first device associated with the request for content, with a threshold relevance; and
responsive to a determination that the request for content is fraudulent, at least one of:

not transmitting a content item, associated with the request for content, to the first device; or discarding the request for content, wherein at least one of:

the first user profile indicates one or more languages associated with the first device; or the generating the relevance score comprises:

determining, based upon the set of user profiles and the first user profile, an expected behavior associated with the first user profile using one or more machine learning techniques; and determining a difference between the expected behavior and a second behavior associated with the resource, wherein the relevance score is indicative of the difference.

16. The non-transitory machine readable medium of claim 15, the operations comprising:

receiving a second request for content from a second device; and responsive to a determination that the second request for content is not fraudulent, transmitting a second content item, associated with the second request for content, to the second device.

17. The non-transitory machine readable medium of claim 15, wherein the first user profile indicates the one or more languages associated with the first device.

18. The non-transitory machine readable medium of claim 15, wherein the generating the relevance score comprises:

determining the expected behavior; and determining the difference between the expected behavior and the second behavior associated with the resource.

19. The non-transitory machine readable medium of claim 15, the operations comprising:

responsive to the determination that the request for content is fraudulent, not transmitting the content item to the first device.

20. The non-transitory machine readable medium of claim 15, the operations comprising:

responsive to the determination that the request for content is fraudulent, discarding the request for content.

* * * * *